United States Patent
Shigihara et al.

(10) Patent No.: US 12,385,522 B2
(45) Date of Patent: Aug. 12, 2025

(54) BEARING DEVICE

(71) Applicant: MITSUBISHI HEAVY INDUSTRIES, LTD., Tokyo (JP)

(72) Inventors: Takuzo Shigihara, Tokyo (JP); Chihiro Yoshimine, Tokyo (JP); Shimpei Yokoyama, Tokyo (JP); Yuki Kameyama, Tokyo (JP); Yoshitomo Noda, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/033,478

(22) PCT Filed: Mar. 7, 2022

(86) PCT No.: PCT/JP2022/009730
§ 371 (c)(1),
(2) Date: Apr. 24, 2023

(87) PCT Pub. No.: WO2022/249627
PCT Pub. Date: Dec. 1, 2022

(65) Prior Publication Data
US 2023/0407916 A1    Dec. 21, 2023

(30) Foreign Application Priority Data
May 25, 2021    (JP) ................. 2021-087514

(51) Int. Cl.
*F16C 3/10*        (2006.01)
*F16C 17/03*       (2006.01)
*F16C 33/10*       (2006.01)

(52) U.S. Cl.
CPC .......... *F16C 17/03* (2013.01); *F16C 33/1045* (2013.01); *F16C 33/1065* (2013.01); *F16C 33/107* (2013.01)

(58) Field of Classification Search
CPC .... F16C 17/03; F16C 17/035; F16C 33/1045; F16C 33/106; F16C 33/1065; F16C 33/107; F16C 37/00; F16C 37/002
See application file for complete search history.

(56) References Cited

U.S. PATENT DOCUMENTS

2014/0205224 A1    7/2014    Hemmi et al.
2020/0355218 A1*   11/2020   Sato ................. F16C 37/002
2022/0260113 A1    8/2022    Takara et al.

FOREIGN PATENT DOCUMENTS

DE    112019007871         9/2022
EP            298835 A  *  1/1989   .............. F16C 17/03
(Continued)

OTHER PUBLICATIONS

Machine Translation of JP-57195914-A (Year: 1982).*
(Continued)

*Primary Examiner* — Alan B Waits
(74) *Attorney, Agent, or Firm* — Wenderoth, Lind & Ponack, L.L.P.

(57) ABSTRACT

A bearing device includes a plurality of bearing pads tiltably supporting a rotation shaft which rotates about an axial line, from the outer circumferential side of the rotation shaft, the bearing pads being spaced apart along the circumferential direction; and an oil supply part that supplies oil between the outer circumferential surface of the rotation shaft and pad surfaces of the bearing pads which face the rotation shaft. The plurality of bearing pads include a first bearing pad that supports the rotation shaft directly below the axial line, and a pair of second bearing pads which sandwich the first bearing pad from the rotation direction. Among the first bearing pad and the second bearing pads, a groove is formed only on the pad surfaces of the second bearing pads so as to extend in the rotation direction.

6 Claims, 4 Drawing Sheets

(56) References Cited

FOREIGN PATENT DOCUMENTS

| JP | 57195914 A | * | 12/1982 | | |
|---|---|---|---|---|---|
| JP | 06-26516 | | 2/1994 | | |
| JP | H09144750 A | * | 6/1997 | | |
| JP | 2011-074805 | | 4/2011 | | |
| JP | 5911125 | | 4/2016 | | |
| JP | 2016-217364 | | 12/2016 | | |
| JP | 6200722 | | 9/2017 | | |
| WO | 2013/046404 | | 4/2013 | | |
| WO | WO-2017202598 A1 | * | 11/2017 | ............. | F16C 17/03 |

OTHER PUBLICATIONS

Machine Translation of EP-298835-A (Year: 1989).*
Machine Translation of JP-H09144750-A (Year: 1997).*
Machine Translation of WO-2017202598-A1 (Year: 2017).*
International Search Report issued May 17, 2022 in corresponding International (PCT) Patent Application No. PCT/JP2022/009730.

* cited by examiner

BEARING DEVICE

TECHNICAL FIELD

The present disclosure relates to a bearing device.

Priority is claimed on Japanese Patent Application No. 2021-087514, filed May 25, 2021, the content of which is incorporated herein by reference.

BACKGROUND ART

PTL 1 discloses a bearing device including bearing pads disposed in a load-on-pad (LOP) manner, which is used in a rotary machine such as a compressor or a steam turbine. A rotating shaft supported by the bearing device may vibrate under the influence of an excitation force applied from the outside. When the rotating shaft vibrates and is displaced, a bearing housing or a bearing ring surrounding the rotating shaft from the outside is pushed outward via an oil film. At that time, the bearing housing and the bearing ring function as dampers that dampens vibration of the rotating shaft by returning an oil film reaction force to the rotating shaft.

In the bearing device of PTL 1, oil reservoir portions are formed in both side portions of the bearing ring in a horizontal direction, the bearing ring surrounding a periphery of the bearing housing. Accordingly, the magnitudes of horizontal and vertical components of the oil film reaction force that the bearing ring returns to the rotating shaft during vibration of the rotating shaft can be made different. Namely, the anisotropy of an oil film reaction force from the bearing pads toward the rotating shaft can be increased. As a result, vibration stability of the rotating shaft is improved.

CITATION LIST

Patent Literature

[PTL 1] Japanese Patent No. 5911125

SUMMARY OF INVENTION

Technical Problem

When the vibration stability of the rotating shaft is improved, the rotation speed of the rotary machine can be increased. However, when the rotation speed of the rotary machine is increased, the temperature of the oil film increases, the oil film being a portion sliding on the rotating shaft, and the temperature of the bearing pads increases more than before, which is a problem.

In addition, in the case of the bearing device in which the bearing pads are disposed in an LOP manner, an oil film reaction force that is returned to the rotating shaft by a bearing pad disposed directly below the rotating shaft is larger than oil film reaction forces of the other bearing pads. Namely, the anisotropy of the oil film reaction force can also be increased by the disposition of the bearing pads. Meanwhile, a load applied to the bearing pad disposed directly below the rotating shaft is larger than those applied to the other bearing pads. For this reason, when vibration stability of the rotating shaft is improved, the temperature of the bearing pad directly below the rotating shaft increases, which is a problem.

The present disclosure is conceived to solve the foregoing problems, and an object of the present disclosure is to provide a bearing device capable of suppressing an increase in the temperature of a bearing pad while improving vibration stability of a rotating shaft.

Solution to Problem

According to the present disclosure, in order to solve the foregoing problems, there is provided a bearing device including: a plurality of bearing pads that tiltably support a rotating shaft rotating around an axis, from an outer peripheral side, and that are provided at intervals in a circumferential direction; and an oil supply unit that supplies oil to a gap between a pad surface of each of the bearing pads and an outer peripheral surface of the rotating shaft, the pad surface facing the rotating shaft. Each of the plurality of bearing pads includes a first bearing pad that supports the rotating shaft from directly below the axis, and a pair of second bearing pads disposed to sandwich the first bearing pad between the second bearing pads in a rotation direction. A groove extending in the rotation direction is formed only in the pad surface of the second bearing pad out of the first bearing pad and the second bearing pad.

Advantageous Effects of Invention

According to the bearing device of the present disclosure, it is possible to suppress an increase in the temperature of the bearing pad while improving vibration stability of the rotating shaft.

DESCRIPTION OF EMBODIMENTS

First Embodiment (Bearing Device)

Hereinafter, a bearing device according to embodiments of the present disclosure will be described with reference to the drawings.

The bearing device of the present embodiment is a bearing device used in a rotary machine such as a compressor or a steam turbine. The bearing device is a radial bearing that rotatably supports a rotating shaft of the rotary machine.

Figure 1:
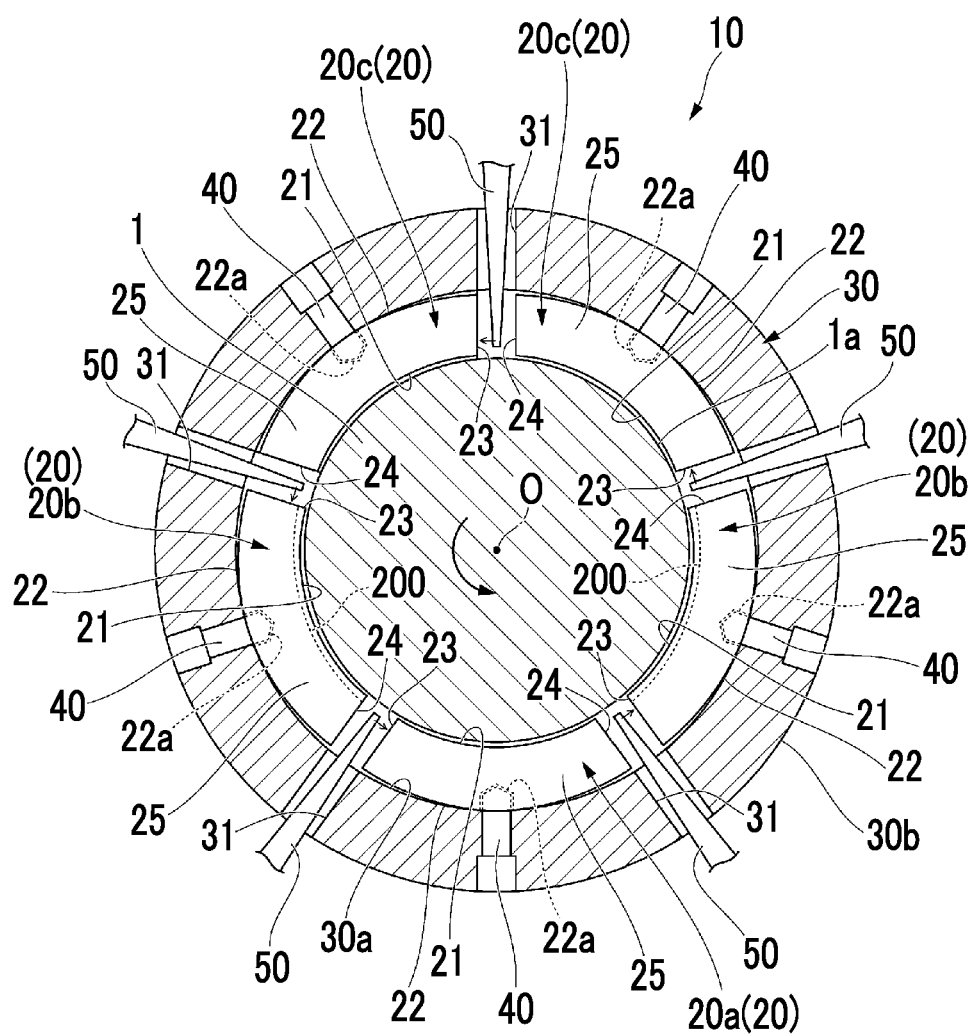
FIG. 1 is a cross-sectional view of a bearing device according to embodiments of the present disclosure taken along a direction orthogonal to an axis.

As shown in FIG. 1, a bearing device 10 includes a bearing pad 20, a housing 30, a pivot shaft 40, and an oil supply unit 50.

(Bearing Pad)

The bearing pad 20 is a member that extends in an axis O direction, and that tiltably supports a rotating shaft 1, which rotates around an axis O, from an outer peripheral side. In the present embodiment, five bearing pads 20 are provided at equal intervals in a circumferential direction around the rotating shaft 1.

The bearing pad 20 has a pad surface 21, a back surface 22, a leading side surface 23, a trailing side surface 24, and side surfaces 25.

The pad surface 21 is an inner peripheral surface that is recessed outward in a radial direction when viewed in the axis O direction, that has a uniform arc shape having a radius of curvature of a predetermined dimension, and that extends in the axis O direction while maintaining the arc shape. Namely, the pad surface 21 has a cylindrical surface shape that is concave outward in the radial direction. The pad surface 21 faces an outer peripheral surface 1a of the rotating shaft 1. Accordingly, for example, during rotation of the rotating shaft 1, oil as a lubricant is supplied to a gap defined between the pad surface 21 and the outer peripheral surface 1a of the rotating shaft 1, and an oil film is formed in the gap. The pad surface 21 slidably (rotatably) supports the rotating shaft 1 from the outer peripheral side via the oil film.

In the present embodiment, an outer periphery-side end portion forming the back surface 22 of the bearing pad 20 is a base portion (not shown) made of a steel material or the like. For example, a bearing steel such as white metal is laminated on the base portion. Namely, the pad surface 21 is formed by laminating the bearing steel on the base portion.

The back surface 22 is an outer peripheral surface having a cylindrical surface shape which is located opposite to the pad surface 21, which has a uniform arc shape having a radius of curvature of a predetermined dimension, and which extends in the axis O direction while maintaining the arc shape. Namely, the back surface 22 has a cylindrical surface shape that is convex outward in the radial direction. A recessed portion 22a that is recessed inward in the radial direction is formed at substantially the center of the back surface 22.

The leading side surface 23 and the trailing side surface 24 are surfaces that connect the pad surface 21 and the back surface 22, and that face a rotation direction T of the rotating shaft 1.

The side surfaces 25 are a pair of surfaces that connect the pad surface 21, the back surface 22, the leading side surface 23, and the trailing side surface 24, and that face the axis O direction.

By means of the pad surface 21, the back surface 22, the leading side surface 23, the trailing side surface 24, and the side surfaces 25, the bearing pad 20 extends in an arc shape in the circumferential direction in a cross-sectional view orthogonal to the axis O, and has a curved plate shape having a uniform radial dimension from the pad surface 21 to the back surface 22.

The bearing pad 20 includes a first bearing pad 20a, a second bearing pad 20b, and a third bearing pad 20c. The first bearing pad 20a supports the rotating shaft 1 from directly below the axis O. A pair of the second bearing pads 20b are disposed to sandwich the first bearing pad 20a in the rotation direction T of the rotating shaft 1. The third bearing pad 20c supports the rotating shaft 1 from above the axis O. In the present embodiment, the bearing pad 20 includes one first bearing pad 20a, two second bearing pads 20b, and two third bearing pads 20c.

(Second Bearing Pad)

Figure 2:
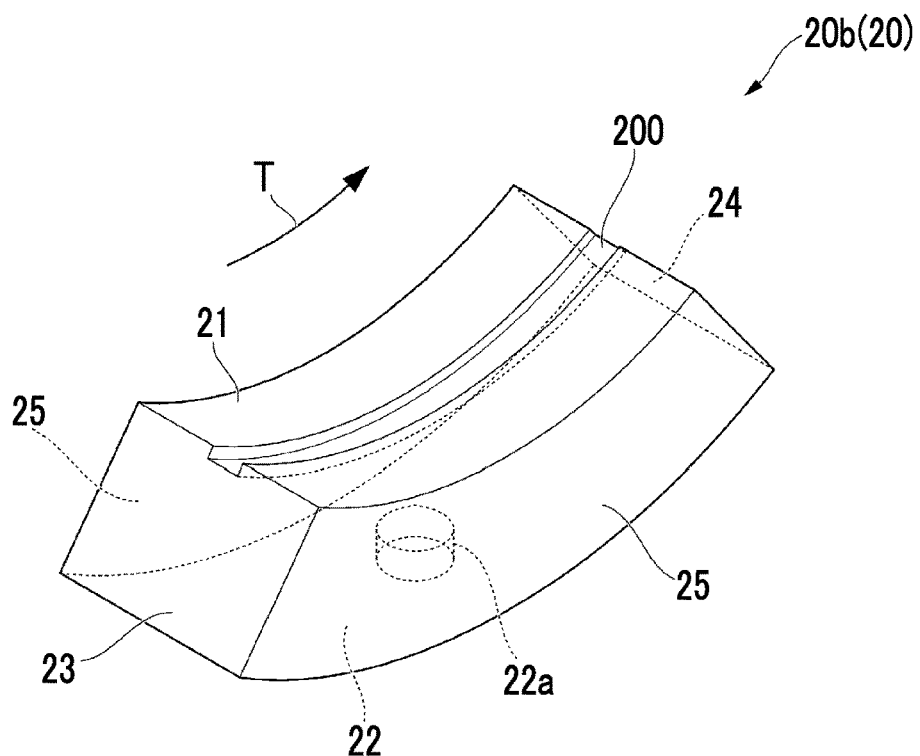
FIG. 2 is a perspective view of a second bearing pad of the bearing device according to a first embodiment of the present disclosure.

As shown in FIG. 2, a groove 200 extending in the rotation direction T is formed in the pad surface 21 of the second bearing pad 20b. More specifically, the groove 200 extends from the leading side surface 23 to the trailing side surface 24 along the pad surface 21, and is open on the leading side surface 23 and on the trailing side surface 24. In the present embodiment, one groove 200 is formed in the pad surface 21 of the second bearing pad 20b.

(Housing)

As shown in FIG. 1, the housing 30 has an annular shape surrounding the axis O, covers the rotating shaft 1 and the bearing pads 20 from the outer peripheral side, and swingably supports the bearing pads 20 from the outer peripheral side. The housing 30 has an inner surface 30a having a cylindrical surface shape which is formed with a uniform curvature smaller than that of the back surface 22 of the bearing pad 20. In the present embodiment, the inner surface 30a of the housing 30 is in line contact with the back surface 22 of the bearing pad 20, and the bearing pad 20 is swingably supported on the inner surface 30a. Accordingly, a so-called tilting mechanism is configured between the housing 30 and the bearing pad 20.

A plurality of oil supply holes 31 are formed in the housing 30 at equal intervals in the circumferential direction. In the present embodiment, the oil supply holes 31 penetrate through the housing 30 in the radial direction from an outer surface 30b to the inner surface of the housing 30. The oil supply holes 31 of which the number is the same as that of the bearing pads 20 are formed. An opening of the oil supply hole 31 formed in the inner surface 30a of the housing 30 is open to a space existing between the housing 30 and the rotating shaft 1 and between the bearing pads 20.

(Pivot Shaft)

The pivot shaft 40 is a columnar member that swingably positions the bearing pad 20 on the inner surface 30a of the housing 30. The pivot shaft 40 is provided inside the housing 30, and extends in the radial direction toward the inside of the recessed portion 22a formed in the back surface 22 of the bearing pad 20. Namely, an end portion of the pivot shaft 40 protrudes inward from the inner surface 30a of the housing 30 in the radial direction, and is inserted into the recessed portion 22a.

A clearance having a predetermined size exists between an outer surface of the end portion of the pivot shaft 40 inserted into the recessed portion 22a and an inner surface of the recessed portion 22a. Therefore, when a force to swing the bearing pad 20 acts during operation of the rotary machine, the bearing pad 20 can swing on the inner surface 30a of the housing 30 by the amount of the clearance.

(Oil Supply Unit)

The oil supply unit 50 is a nozzle that supplies the oil as a lubricant supplied from an oil supply device or the like (not shown) existing outside the bearing device to the inside of the housing 30. The oil supply unit extends from the outside toward the inside of the housing 30 in the radial direction. More specifically, the oil supply unit 50 passes through the inside of the oil supply hole 31 in a process of extending from the outside toward the inside of the housing 30. An end portion of the oil supply unit 50 is located between the bearing pads 20. The oil supply unit 50 sprays the oil in the rotation direction T in the space inside the housing (Actions and Effects)

Subsequently, an operation of the bearing device 10 according to the present embodiment will be described. When the rotating shaft 1 is rotated by the operation of the rotary machine, the oil is supplied to gaps between the rotating shaft 1 and the bearing pads 20 from the oil supply unit 50. Then, the gaps defined by the outer peripheral surface 1a of the rotating shaft 1 and the pad surfaces 21 of the bearing pads 20 are filled with the lubricant, and oil films are formed. Accordingly, the rotating shaft 1 is slidably (rotatably) supported by the pad surfaces 21 via the oil films.

Here, in the bearing device 10 of the present embodiment, since the groove 200 is formed in the pad surface 21 of each of the pair of second bearing pads 20b, the area of the pad surface 21 is reduced and the surface pressure decreases compared to when the groove 200 is not formed in the pad surface 21. Accordingly, for example, when an excitation force from the outside is applied to the rotating shaft 1, an oil film reaction force that the rotating shaft 1 receives when pushing the bearing pad 20 via the oil film decreases. Meanwhile, the pad surface 21 of the first bearing pad 20a is configured to support the rotating shaft 1 from directly below the axis O in a direction of gravity, and at the same time, the groove 200 is not formed in the pad surface 21. Namely, an oil film reaction force from the pad surface 21 of the first bearing pad 20a toward the rotating shaft 1 is larger than an oil film reaction force from the second bearing pad 20b toward the rotating shaft 1. Namely, the magnitude of the oil film reaction force from the bearing pad 20 toward the rotating shaft 1 can be made different between the first bearing pad 20a and the second bearing pad 20b. Therefore, the anisotropy of the oil film reaction force generated on the rotating shaft 1 during operation of the rotary machine can be increased, and as a result, vibration stability of the rotating shaft 1 can be improved.

In addition, the oil supplied from the oil supply unit 50 enters the groove 200 formed in the pad surface 21 of the second bearing pad 20b. Accordingly, the inside of the second bearing pad 20b can be cooled, and a larger amount of the oil can be supplied to the gap between the housing 30 and the rotating shaft 1. Therefore, an increase in the temperature of the bearing pad 20 can be suppressed.

(Modification Examples of First Embodiment)

Figure 3:
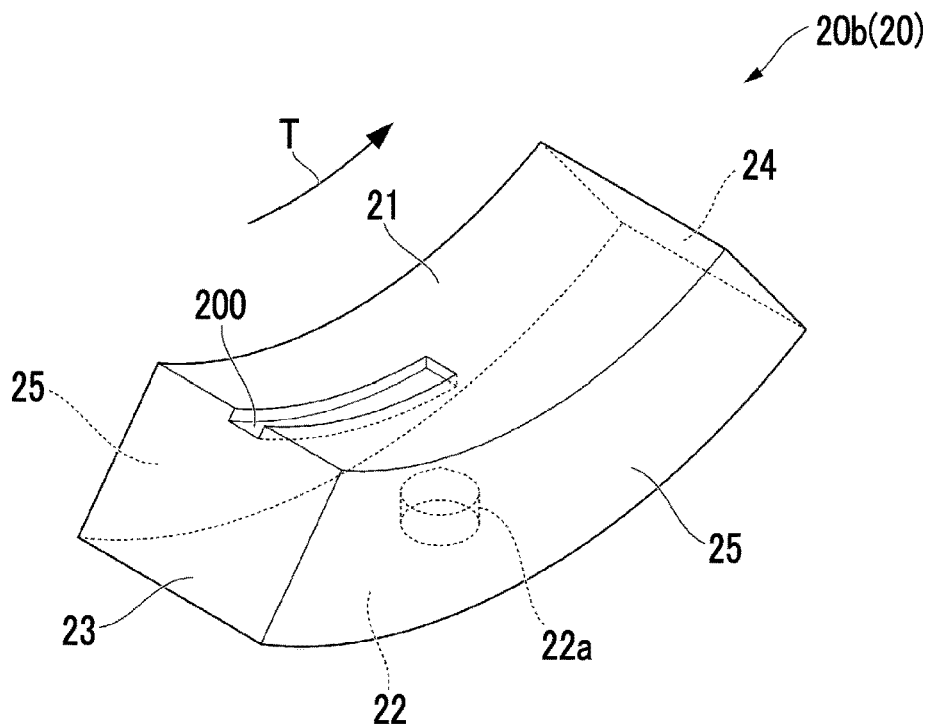
FIG. 3 is a perspective view of a second bearing pad according to a first modification example of the first embodiment of the present disclosure.

As a first modification example of the first embodiment, for example, the second bearing pad 20b shown in FIG. 3 may be adopted. In the first modification example, a configuration of the groove 200 formed in the pad surface 21 of the second bearing pad 20b is different from that of the first embodiment.

In the first modification example, the groove 200 is open only on the leading side surface 23, and extends along the pad surface 21 from the leading side surface 23 to an intermediate position on the pad surface 21 toward the trailing side surface 24.

Even with this configuration, the same actions and effects as those of the first embodiment can be obtained.

Figure 4:
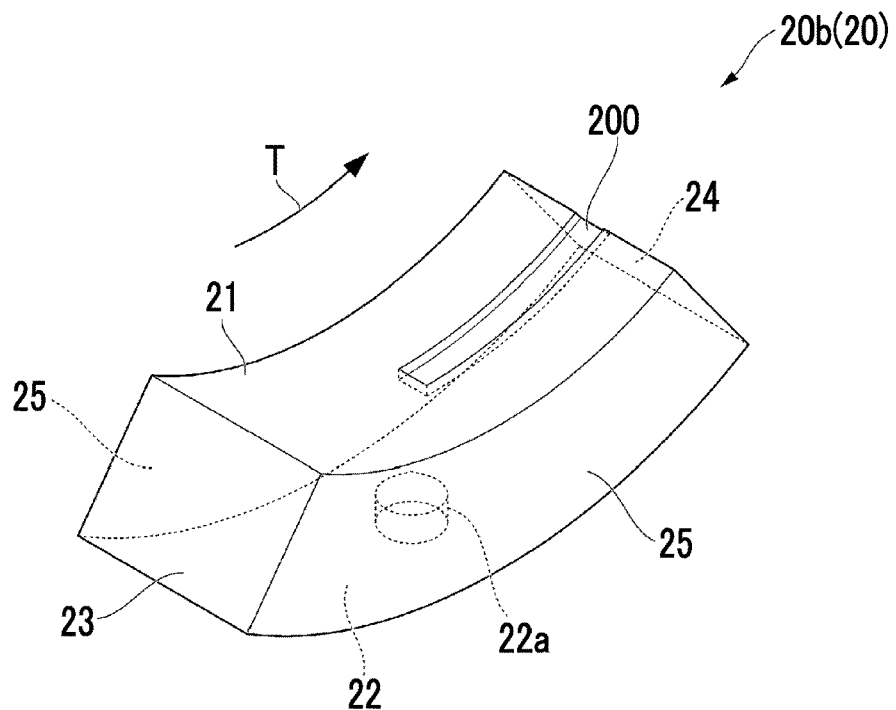
FIG. 4 is a perspective view of a second bearing pad according to a second modification example of the first embodiment of the present disclosure.

As a second modification example of the first embodiment, for example, the second bearing pad 20b shown in FIG. 4 may be adopted. In the second modification example, a configuration of the groove 200 formed in the pad surface 21 of the second bearing pad 20b is different from that of the first embodiment.

In the second modification example, the groove 200 is open only on the trailing side surface 24, and extends along the pad surface 21 from the trailing side surface 24 to an intermediate position on the pad surface 21 toward the leading side surface 23.

Even with this configuration, the same actions and effects as those of the first embodiment can be obtained.

Second Embodiment

Figure 5:
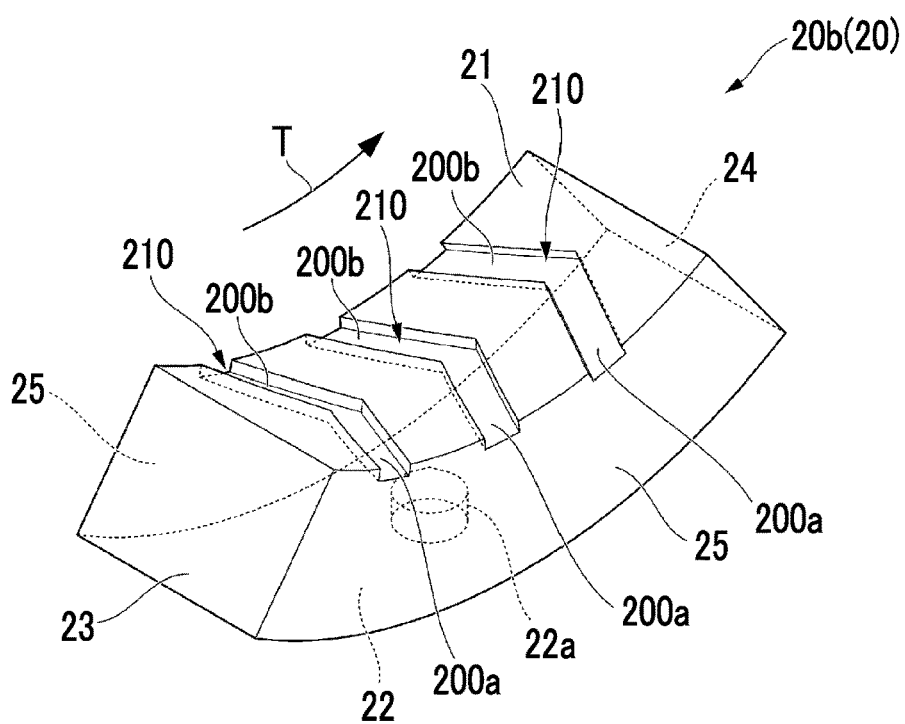
FIG. 5 is a perspective view of a second bearing pad of a bearing device according to a second embodiment of the present disclosure.

Hereinafter, a bearing device according to a second embodiment of the present disclosure will be described with reference to FIG. 5. The bearing device to be described in the second embodiment is different from that of the first embodiment only in a configuration of a groove formed in the pad surface of the second bearing pad. For this reason, the same components as those of the first embodiment are denoted by the same reference signs, and the detailed descriptions thereof will not be repeated.

(Second Bearing Pad)

A groove 210 extending in the rotation direction T is formed in the pad surface 21 of the second bearing pad 20b. The groove 210 includes a first groove 200a and a second groove 200b.

Figure 6:
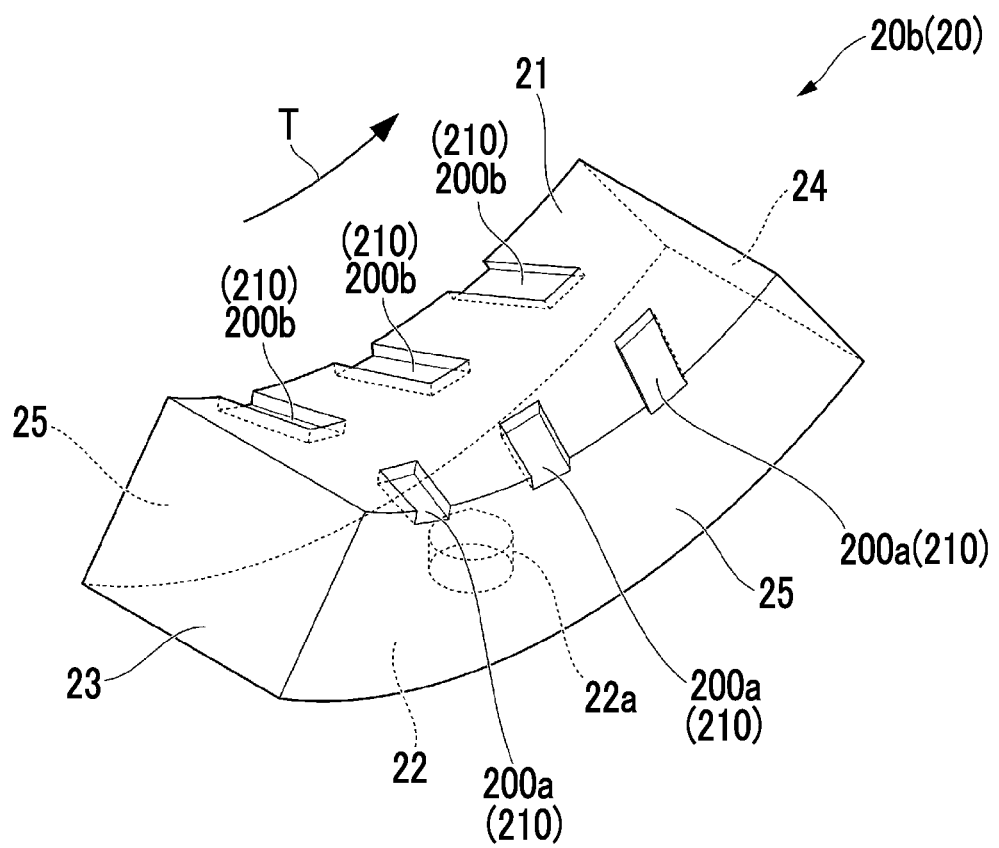
FIG. 6 is a perspective view of a second bearing pad according to a modification example of the second embodiment of the present disclosure.

The first groove 200a is open on one side surface 25 of the pair of side surfaces 25 facing the axis O direction, and separates away from the one side surface 25 as the first groove 200a extends in the rotation direction T. The second groove 200b is open on the other side surface 25, and separates away from the other side surface as the second groove 200b extends in the rotation direction T. In the present embodiment, respective end portions of tips of the first groove 200a and the second groove 200b extending in the rotation direction T are connected to each other on the pad surface 21 to form one groove 210. Namely, the groove 210 is formed in a herringbone shape, which extends in the rotation direction T, in the pad surface 21. In the present embodiment, a plurality of the grooves 210 are formed in the pad surface 21, and FIG. 5 shows a case where three grooves 210 are formed. As shown in FIG. 6, the respective end portions of tips of the first groove 200a and the second groove 200b extending in the rotation direction T may not be connected to each other in a state where the end portions are close to each other on the pad surface 21.

(Actions and Effects)

According to the above configuration, the same actions and effects as those of the first embodiment can be obtained.

Meanwhile, when an oil film reaction force from the second bearing pad 20b toward the rotating shaft 1 decreases, a probability that the rotating shaft 1 causes unbalanced vibration not caused by an external excitation force increases. Since the grooves 210 are formed in the pad surface 21 of the second bearing pad 20b, an oil film reaction force that cancels a force applied to the bearing pad 20 from the rotating shaft 1 when unbalanced vibration occurs can be returned from the pad surface 21.

In addition, in the bearing device 10 according to the second embodiment, the plurality of grooves 210 are formed in the pad surface 21 of the second bearing pad 20b.

Accordingly, the above actions and effects can be further enhanced.

Other Embodiments

Hereinafter, the embodiments of the present disclosure have been described in detail with reference to the drawings, but the specific configurations are not limited to the configurations of each embodiment, and the addition, omission, and replacement of configurations and other changes can be made without departing from the concept of the present disclosure. In addition, the present disclosure is not limited by the embodiments, and is limited only by the claims.

A plurality of the grooves 200 described in the first embodiment and in the modification examples of the first embodiment may be formed in the pad surface 21 of the second bearing pad 20b. Accordingly, the actions and effects described in the first embodiment can be further enhanced.

In addition, in the embodiments, the groove 200 or 210 may be formed in the pad surface 21 of the third bearing pad 20c.

According to the above configuration, the oil supplied from the oil supply unit 50 enters the groove 200 or 210 formed in the pad surface 21 of the third bearing pad 20c. Accordingly, the inside of the third bearing pad 20c can be cooled, and a larger amount of the oil can be supplied to the gap between the housing 30 and the rotating shaft 1. Therefore, an increase in the temperature of the bearing pad 20 can be suppressed.

In addition, in the embodiments, the configuration has been described in which the bearing pad 20 includes one first bearing pad 20a, two second bearing pads 20b, and two third bearing pads 20c, but the present disclosure is not limited to this configuration. The bearing pad 20 may include one first bearing pad 20a, two second bearing pads 20b, and one third bearing pad 20c. In this case, the first bearing pad 20a, the second bearing pads 20b, and the third bearing pad 20c may be disposed at equal intervals in the circumferential direction. Namely, the configuration may be such that the first bearing pad 20a is disposed directly below the rotating shaft 1, a pair of the second bearing pads 20b are disposed right beside the rotating shaft 1, and the third bearing pad 20c is disposed directly above the rotating shaft 1.

Additional Notes

For example, the bearing device according to the embodiments is understood as follows.

(1) A bearing device 10 according to a first aspect includes: a plurality of bearing pads 20 that tiltably support a rotating shaft 1 rotating around an axis O, from an outer peripheral side, and that are provided at intervals in a circumferential direction; and an oil supply unit 50 that supplies oil to a gap between a pad surface 21 of each of the bearing pads 20 and an outer peripheral surface 1a of the rotating shaft 1, the pad surface 21 facing the rotating shaft 1. Each of the plurality of bearing pads 20 includes a first bearing pad 20a that supports the rotating shaft 1 from directly below the axis O, and a pair of second bearing pads 20b disposed to sandwich the first bearing pad 20a between the second bearing pads 20b in a rotation direction T. A groove 200 or 210 extending in the rotation direction T is formed only in the pad surface 21 of the second bearing pad 20b out of the first bearing pad 20a and the second bearing pad 20b.

According to the above configuration, since the groove 200 is formed in the pad surface 21 of each of the pair of second bearing pads 20b, the area of the pad surface 21 is reduced and the surface pressure decreases compared to when the groove 200 is not formed. Accordingly, for example, when an excitation force from the outside is applied to the rotating shaft 1, an oil film reaction force that the rotating shaft 1 receives when pushing the bearing pad 20 via the oil film decreases. Meanwhile, the pad surface 21 of the first bearing pad 20a is configured to support the rotating shaft 1 from directly below the axis O in a direction of gravity, and at the same time, the groove 200 is not formed. Namely, an oil film reaction force from the pad surface 21 of the first bearing pad 20a toward the rotating shaft 1 is larger than an oil film reaction force from the second bearing pad 20b toward the rotating shaft 1. Namely, the magnitude of the oil film reaction force from the bearing pad 20 toward the rotating shaft 1 can be made different between the first bearing pad 20a and the second bearing pad 20b. In addition, the oil supplied from the oil supply unit 50 enters the groove 200 formed in the pad surface 21 of the second bearing pad 20b. Accordingly, the inside of the second bearing pad 20b can be cooled, and a larger amount of the oil can be supplied to the gap between the housing 30 and the rotating shaft 1.

(2) According to the bearing device 10 of a second aspect, in the bearing device 10 of (1), the bearing pad 20 may have a pair of side surfaces 25 that connect the pad surface 21 and a back surface 22 located opposite to the pad surface 21, and that face an axis O direction. The groove 210 may include a first groove 200a that is open on one side surface 25, and that separates away from the one side surface 25 as the first groove 200a extends in the rotation direction T, and a second groove 200b that is open on the other side surface 25, and that separates away from the other side surface 25 as the second groove 200b extends in the rotation direction T.

According to the above configuration, the same actions and effects as those described above can be obtained. Meanwhile, when an oil film reaction force from the second bearing pad 20b toward the rotating shaft 1 decreases, a probability that the rotating shaft 1 causes unbalanced vibration not caused by an external excitation force increases. Since the groove 210 is formed in the pad surface 21 of the second bearing pad 20b, an oil film reaction force that cancels a force applied to the bearing pad 20 from the rotating shaft 1 when unbalanced vibration occurs can be returned from the pad surface 21.

(3) According to the bearing device 10 of a third aspect, in the bearing device 10 of (1) or (2), the bearing pad 20 may further include a third bearing pad 20c which supports the rotating shaft 1 from above the axis O, and in which the groove 200 or 210 is formed in the pad surface 21.

According to the above configuration, the oil supplied from the oil supply unit 50 enters the groove 200 or 210 formed in the pad surface 21 of the third bearing pad 20c. Accordingly, the inside of the third bearing pad can be cooled, and a larger amount of the oil can be supplied to the gap between the housing 30 and the rotating shaft 1.

(4) According to the bearing device 10 of a fourth aspect, in the bearing device 10 of any one of (1) to (3), a plurality of the grooves 200 or 210 may be formed in the pad surface 21.

Accordingly, the above actions and effects can be further enhanced.

INDUSTRIAL APPLICABILITY

According to the bearing device of the present disclosure, it is possible to suppress an increase in the temperature of the bearing pad while improving vibration stability of the rotating shaft.

REFERENCE SIGNS LIST

1: rotating shaft
1a: outer peripheral surface
10: bearing device
20: bearing pad
20a: first bearing pad
20b: second bearing pad
20c: third bearing pad
21: pad surface
22: back surface
22a: recessed portion
23: leading side surface
24: trailing side surface
25: side surface 30: housing
30a: inner surface
30b: outer surface
31: oil supply hole
40: pivot shaft
50: oil supply unit
200, 210: groove
200a: first groove
200b: second groove
O axis
T: rotation direction

The invention claimed is:

1. A bearing device comprising:
a plurality of bearing pads that tiltably support a rotating shaft rotating around an axis, from an outer peripheral side, and that are provided at intervals in a circumferential direction; and
an oil supply unit that supplies oil to a gap between a pad surface of each of the bearing pads and an outer peripheral surface of the rotating shaft, the pad surface facing the rotating shaft,
wherein the plurality of bearing pads includes a single first bearing pad that supports the rotating shaft from directly below the axis, and a pair of second bearing pads disposed to sandwich the first bearing pad between the second bearing pads in a rotation direction,
a groove extending in the rotation direction is formed only in the pad surface of each of the second bearing pads out of the first bearing pad and the pair of second bearing pads, and
for each second bearing pad, the groove is open only on a leading side surface of the second bearing pad and extends along the pad surface from the leading side surface toward a trailing side surface of the second bearing pad, and ends at an intermediate position on the pad between the leading side surface and the trailing side surface.

2. The bearing device according to claim 1,
wherein the plurality of bearing pads further includes a third bearing pad which supports the rotating shaft from above the axis, and in which a groove extending in the rotation direction is formed in the pad surface of the third bearing pad.

3. A bearing device comprising:
a plurality of bearing pads that tiltably support a rotating shaft rotating around an axis, from an outer peripheral side, and that are provided at intervals in a circumferential direction; and
an oil supply unit that supplies oil to a gap between a pad surface of each of the bearing pads and an outer peripheral surface of the rotating shaft, the pad surface facing the rotating shaft,
wherein the plurality of bearing pads includes a single first bearing pad that supports the rotating shaft from directly below the axis, and a pair of second bearing pads disposed to sandwich the first bearing pad between the second bearing pads in a rotation direction,
a groove extending in the rotation direction is formed only in the pad surface of each of the second bearing pads out of the first bearing pad and the pair of second bearing pads,
wherein each of the plurality of bearing pads has a pair of side surfaces that connect the pad surface and a back surface located opposite to the pad surface, and that face an axis direction,
the groove includes a first groove that is open on one side surface of the pair of side surfaces, and that separates away from the one side surface as the first groove extends in the rotation direction, and a second groove that is open on the other side surface of the pair of side surfaces, and that separates away from the other side surface as the second groove extends in the rotation direction, and
the first groove extends to a closed end at a tip of the first groove in the rotation direction, the second groove extends to a closed end at a tip of the second groove in the rotation direction, and the closed end of the first groove and the closed end of the second groove are spaced apart from each other in the axis direction.

4. The bearing device according to claim 3,
wherein the plurality of bearing pads further includes a third bearing pad which supports the rotating shaft from above the axis, and in which a groove extending in the rotation direction is formed in the pad surface of the third bearing pad.

5. A bearing device comprising:
a plurality of bearing pads that tiltably support a rotating shaft rotating around an axis, from an outer peripheral side, and that are provided at intervals in a circumferential direction; and
an oil supply unit that supplies oil to a gap between a pad surface of each of the bearing pads and an outer peripheral surface of the rotating shaft, the pad surface facing the rotating shaft,
wherein the plurality of bearing pads includes a single first bearing pad that supports the rotating shaft from directly below the axis, and a pair of second bearing pads disposed to sandwich the first bearing pad between the second bearing pads in a rotation direction,
a groove extending in the rotation direction is formed only in the pad surface of each of the second bearing pads out of the first bearing pad and the pair of second bearing pads, and
for each second bearing pad, the groove is open only on a trailing side surface of the second bearing pad and extends along the pad surface from the trailing side surface toward a leading side surface of the second bearing pad, and ends at an intermediate position on the pad between the trailing side surface and the leading side surface.

6. The bearing device according to claim 4,
wherein the plurality of bearing pads further includes a third bearing pad which supports the rotating shaft from above the axis, and in which a groove extending in the rotation direction is formed in the pad surface of the third bearing pad.

* * * * *